May 13, 1930. C. A. HOXIE 1,758,794
FILM DRIVING
Filed Aug. 12, 1927
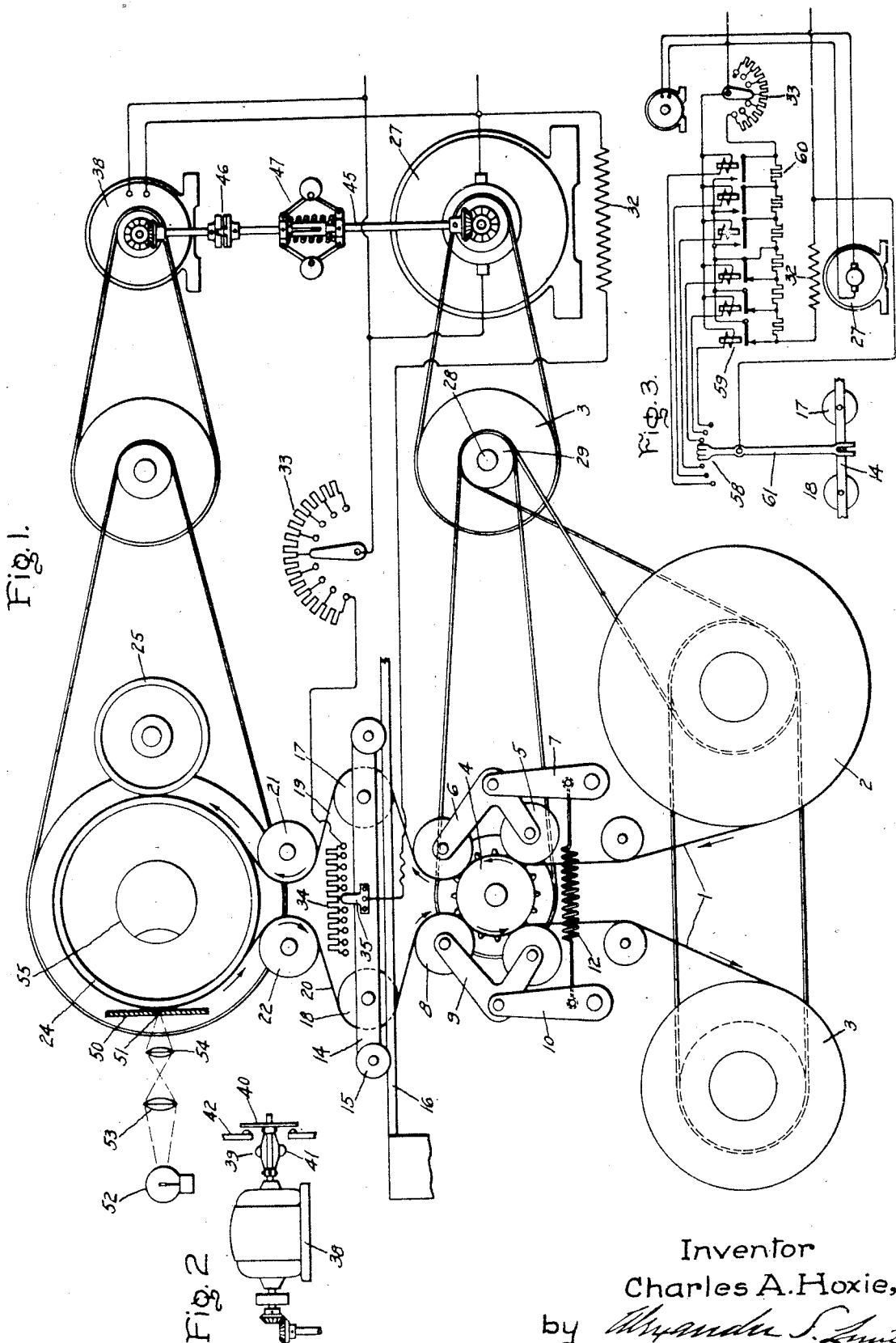
Inventor
Charles A. Hoxie,
by *Alexander S. Lima*
His Attorney.

Patented May 13, 1930

1,758,794

UNITED STATES PATENT OFFICE

CHARLES A. HOXIE, OF SCHENECTADY, NEW YORK, ASSIGNOR TO GENERAL ELECTRIC COMPANY, A CORPORATION OF NEW YORK

FILM DRIVING

Application filed August 12, 1927. Serial No. 212,599.

My invention relates to the recording of sound on a film and to the reproduction of sound from a film record. In apparatus which I use for making a sound film record and for reproducing sound from such a record the film is drawn from one reel, passed through a light beam, which in the case of a recorder varies in accordance with the sound being recorded, and is rewound on another reel. For the proper recording and reproduction of the sound it is essential that the film should be moved past the light beam with a high degree of steadiness or uniformity as slight variations in its speed, particularly in the reproduction of music, are at once noticeable and are very objectionable. Difficulty is encountered in constructing a winding means for the film which has the necessary power to meet the varying loads of the reels, the take-up devices thereof, etc., and which also has the desired delicacy of speed regulation. One object of my invention therefore is the provision of improved means for moving a film which avoids the difficulty mentioned above and which is efficient and practicable. Another object of my invention is the provision of an improved method of and means for simultaneously moving the same total length of film by means of two different film engaging drives.

Referring to the drawing. Fig. 1 illustrates an arrangement comprising one embodiment of my invention: Fig. 2 shows a speed regulated motor forming a part of the apparatus; and Fig. 3 shows a detail of a modification.

In the drawing, which is more or less diagrammatic, the film 1 is shown being unwound from the reel 2 and being wound up on the reel 3. From reel 2 the film, which in the present case is provided with sprocket tooth openings, passes to the main film driving member 4, shown as a sprocket against one side of which the film is yieldingly pressed by the idlers 5 carried by the holder 6, pivoted to the lever 7. On its return to the winding drum the film engages the other side of the sprocket against which it is pressed by other idlers 8 carried by the holders 9 pivoted to the lever 10. In certain cases it may be found more convenient to employ sprocket means comprising separate sprockets for engaging the film approaching and leaving the drum instead of the single sprocket illustrated. The two levers 7 and 10 are connected by the spring 12, the two sets of idlers being readily retracted from the sprocket to facilitate threading the film. Above the sprocket the carriage 14 is mounted on the wheels 15 to travel horizontally on the track 16 the carriage being of light construction and easily moved. At spaced points on the carriage are mounted the idlers 17 and 18 over which the film passes in loops 19 and 20 respectively between the idler 5 and the fixed idler 21 and between idler 18 and the fixed idler 22. From idler 21 the film passes around the film supporting and driving drum 24 against which it is pressed by the idler 25 having a resilient face, the drum forming what will hereafter be termed a belt-type drive for the film.

The main film driving sprocket 4 and the two reels 2 and 3 are connected to be operated by the main driving motor 27. The connection between the motor and the members driven thereby may be by any suitable means such as gearing or belts, the latter having been shown for convenience of illustration. The belt connection is shown including the counter shaft 28 carrying belt pulleys 29 and 30, it being understood that a certain amount of belt slippage may occur between the counter shaft and the reels 2 and 3 incident to the change in size of the rolls of film on the reels. I have shown the motor 27 having the shunt field 32 and the rheostats 33 and 34 connected to control the field current. Rheostat 33 is hand operated and is adapted for coarse regulation of the motor speed. Rheostat 34 has the moving contact 35 carried by the carriage 14, the sections of the rheostat being relatively small for the fine regulation of the motor speed.

Drum 24 is driven by a separate small motor 38 which is provided with a suitable speed regulator or governor 39, whereby it runs substantially at constant speed. For the purpose of illustration I have shown in Fig. 2, the motor as having a common form of governor comprising a disk 40 moved longitudinally of the motor shaft by the centrifugal weights 41 against stationary members 42. The load on motor 38 is substantially constant since it has only to rotate the drum 24 with the intervening mechanical connections which may be gearing or a belt drive as illustrated. The film is supplied to and taken from the drum through the loops 19 and 20 at the same speed since the entering and leaving portions at the film engage opposite sides of the same sprocket 4. Any variation in speed of the sprocket results in a corresponding movement of the carriage 14 to the right or to the left to vary the resistance in the field circuit of motor 27 to produce the appropriate change in the speed of the sprocket. The position of the carriage therefore is dependent upon the varying load imposed on the sprocket but its position has substantially no effect upon the load imposed upon the drum 24.

Under certain circumstances it is desirable to connect together the two motor shafts at starting to insure that the film is moved at the same rate by both the sprocket and the drum. For this purpose I have shown a counter shaft 45 comprising two portions geared respectively to the motor shafts and provided with a clutch 46 operated by the centrifugal device 47, the arrangement being such that when starting the two motor shafts are coupled together but just before normal running speed is attained they are automatically disconnected.

The apparatus which I have described may be used either for making a sound record on a moving film or for reproducing sound from a film record. I have chosen to illustrate in diagrammatic manner in Fig. 1 an arrangement which may be used in the reproducing process. Close to the surface of the drum supporting the film is the screen 50, having the narrow light aperture 51, through which passes a narrow light beam from the source 52 having been suitably condensed by the lenses 53 and 54. Within the drum is the photoelectric cell 55 arranged to receive the aforesaid light beam as modified by the sound record on the film. If, instead of reproducing sound from record, a sound record is to be made on the film the light beam exposing the film will be suitably varied in accordance with the sound waves to be recorded, for example, by apparatus such as disclosed in my Patent 1,598,377, August 31, 1926.

Under certain conditions I prefer to use a modified arrangement such as is shown in Fig. 3, where the rheostat 58 operated by the carriage 14 controls the speed of the motor 27 through a series of relays 59. In this modification I have shown the motor 27 as a shunt motor, the field 32 of which is varied by the relays which cut in or out of the circuit more or less of the resistance 60. Hand rheostat 33 is adapted to be operated so as to cause the movable contact of the automatic fine adjustment rheostat to function near its central position and to maintain the carriage generally in a central position as illustrated. The friction of the moving contact is reduced in this case by using a reducing lever 61 between the carriage and contact.

I have chosen the particular embodiment described above as illustrative of my invention and it will be apparent that various modifications may be made without departing from the spirit and scope of my invention, which modifications I aim to cover by the appended claims.

What I claim as new and desire to secure by Letters Patent of the United States is:—

1. In apparatus for recording sound on a film or for reproducing sound from a film record, a film driving means, means for moving portions of the film toward and from said means, a movable member engaging respectively portions of the film approaching and leaving the driving means, and means responsive to the position of said member for controlling the speed of one of said means.

2. In apparatus for recording sound on a film or for reproducing sound from a film record, a film supporting drum, a motor for driving the same, sprocket means for moving said film toward and from said drum, a carriage having members engaging portions of said film approaching and leaving said drum, a motor for driving said sprocket means, and means responsive to the position of said carriage for controlling the speed of the last mentioned motor.

3. In apparatus for recording sound on a film or for reproducing sound from a film record, a plurality of film driving members, a constant speed motor connected with one of said members, a variable speed motor connected with another of said members, means operatively connecting the rotors of said motors, and means responsive to a predetermined speed thereof for interrupting said connection.

4. In apparatus for recording sound on a film or for reproducing sound from a film record, a winding and an unwinding reel for the film, a first film driving means, a second film driving means arranged to engage the film at a plurality of points between said first means and said reels and means comprising a member engaging the film between said first and second means for controlling the speed of the second driving means.

5. In apparatus for recording sound on a film or for reproducing sound from a film record, a film driving member, means for moving the film toward and from said member, a motor connected to drive said means, a movable member arranged to engage the film between said driving member and said means and means responsive to the movement of the movable member for varying the speed of the motor.

6. In combination, film winding and unwinding reels, means for driving the film at a uniform speed, a motor, and separate film driving means engaging the film between said means and each of said reels and connected to said motor, and means effective to vary the speed of said separate film driving means in accordance with the speed of the film as driven by said first means.

7. In combination, film winding and unwinding reels, a member for moving the film at a uniform speed, a motor, sprocket means connected therewith for driving said film, said sprocket means being in engagement with said film between said member and each of said reels, and means controlled by the speed of the film moved by said member for regulating the speed of said sprocket means.

8. In combination, film winding and unwinding reels, a member independent of sprocket teeth engaging the film between said reels for moving the same at a substantially uniform speed, a motor, a sprocket connected therewith and arranged to engage the film at a plurality of points to withdraw the film from the unwinding reel and to feed the film toward the winding reel, and means controlled by a loop in the film between said member and sprocket for regulating the speed of the sprocket.

9. In combination, a drum for engaging and moving a film at a substantially uniform speed, sprocket means for feeding the film toward and withdrawing it from said drum, means for rotating the drum and the sprocket means, and means for controlling the speed of the sprocket means in accordance with the size of a loop in the film between the drum and the sprocket means.

10. In sound recording or reproducing apparatus employing a film having sprocket tooth openings therein, film driving means comprising a sprocket wheel and a drum adapted successively to engage said film, means for operating said driving means, and means responsive to the length of film between said sprocket wheel and said drum for varying the speed of the sprocket wheel.

In witness whereof, I have hereunto set my hand this 10th day of August, 1927.

CHARLES A. HOXIE.